No. 778,643. PATENTED DEC. 27, 1904.
J. P. DURKIN.
CONTROLLER.
APPLICATION FILED OCT. 15, 1904.
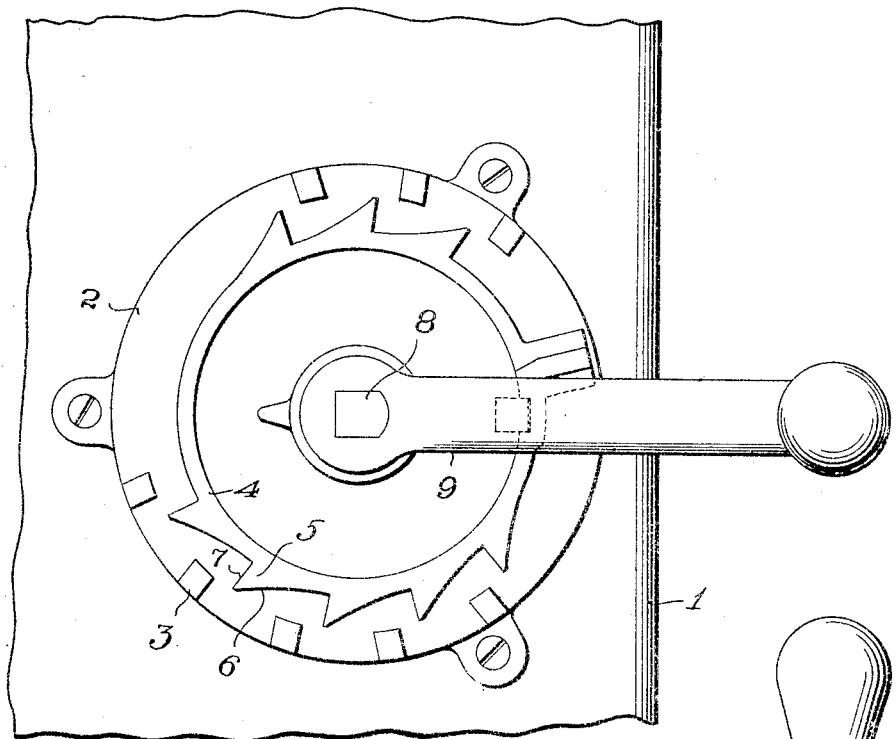
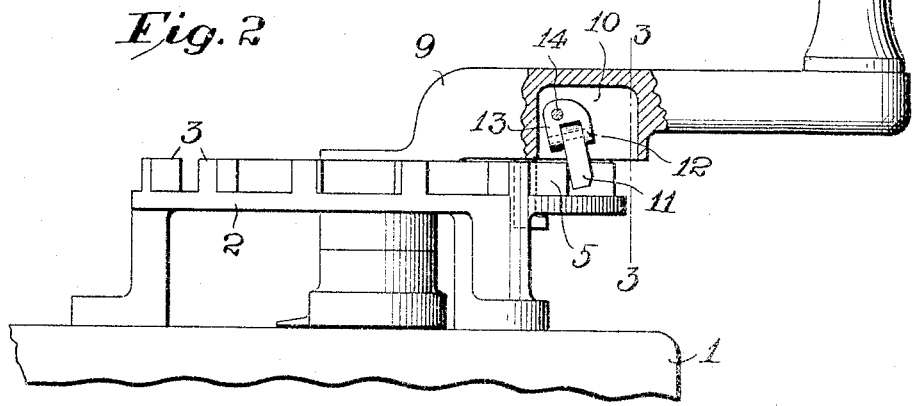
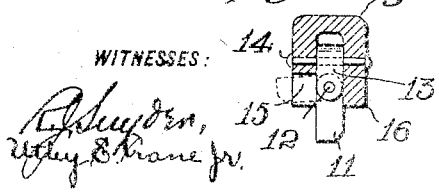
WITNESSES:
INVENTOR
John P. Durkin
BY
Charles N. Butler
ATTORNEY.

No. 778,643.

Patented December 27, 1904.

UNITED STATES PATENT OFFICE.

REISSUED

JOHN P. DURKIN, OF PHILADELPHIA, PENNSYLVANIA, ASSIGNOR TO GEORGE B. KIRKBRIDE, WILLIAM S. TAYLOR, AND EDGAR W. BAIRD, OF PHILADELPHIA, PENNSYLVANIA.

CONTROLLER.

SPECIFICATION forming part of Letters Patent No. 778,643, dated December 27, 1904.

Application filed October 15, 1904. Serial No. 228,608.

*To all whom it may concern:*

Be it known that I, JOHN P. DURKIN, a citizen of the United States, residing at Philadelphia, in the county of Philadelphia and State of Pennsylvania, have invented certain Improvements in Controllers, of which the following is a specification.

This invention relates more particularly to hand-operated controllers for electric car-motors; and its primary object is to provide a simplified device for preventing the current from being thrown on too rapidly, affording an automatic control for effecting a graduated action in supplying current, while permitting it to be thrown off without retardation.

The nature and characteristic features of the improvements will more fully appear by reference to the following description and the accompanying drawings in illustration thereof, of which—

Figure 1 represents a plan view of a hand-operated controller to which my improvements are applied. Fig. 2 represents a side elevation and partial section of the same. Fig. 3 represents a sectional view taken on the line 3 3 of Fig. 2, and Fig. 4 represents a sectional view taken through the controller ring and handle.

As shown in the drawings, the controller-casing 1 supports the ring 2, having thereon the stops 3 and the rack or serrated ring 4, the latter comprising the teeth 5, with the faces 6 inclined to the normal, and the substantially radial faces 7.

The commutator-shaft 8 of the controller is engaged and revolved by a handle 9, provided with a recess 10, in which is pivotally connected a dog 11. The dog has the pivotal joint 12 with the coupling 13, and the coupling has the pivotal joint 14 with the handle, the axis of the joint 14 being removed toward the center of rotation of the handle from the parallel plane passing through the center of gravity of the dog and coupling. A universal or gimble joint is thus provided between the dog and handle; but while the dog is free to oscillate outwardly in the recess 10 and forwardly in the recess 15 it is limited in its rearward movement by the dependent portion 16 of the handle. As the handle is turned forward the dog 11, held by gravity against the inclined face 6 of the adjacent tooth 5, is thrust outwardly thereby into the circle occupied by the stops 3 and by the inertia of motion strikes a stop 3 in its path, checking the movement of the handle by the contact of its part 16 with the dog. The movement thus being checked and the pressure on the handle being sufficiently relaxed, the dog swings inward by gravity between the stop 3, which it has engaged, and the rearward tooth 5, which has effected the engagement, into contact with the base of the succeeding incline 6, from which the action described is repeated until the desired forward position is reached. When it is desired to reverse or throw off the current, the handle can be thrown back to the initial position without check or retardation, as the dog is free to swing up into the recess 15, so as to ride over the teeth 5 upon retraction.

Having described my invention, I claim—

1. A controller having a handle, an oscillating dog connected with said handle, a stop for engaging said dog, and an inclined surface for throwing said dog into engagement with said stop, said dog being disengaged from said stop by gravity, substantially as specified.

2. A controller provided with a dog jointed to permit its movement in two directions, a series of stops for engaging said dog, and a rack for throwing said dog into engagement with said stops, substantially as specified.

3. A controller provided with a dog jointed to permit its movement in two directions, stops for engaging said dog, serrations for throwing said dog against said stops, and automatic means for disengaging said dog from said stops, substantially as specified.

4. A controller having a handle, a coupling pivoted to said handle, a dog pivoted to said coupling, and mechanism for shifting and holding said dog, substantially as specified.

5. A controller having a handle, a coupling pivotally connected therewith to oscillate in the vertical plane thereof, a dog pivotally connected to said coupling to oscillate transversely thereto, and mechanism for shifting and engaging said dog, said dog being disengaged by gravity, substantially as specified.

In testimony whereof I have hereunto set my hand, this 1st day of October, 1904, in the presence of the subscribing witnesses.

JOHN P. DURKIN.

Witnesses:
   CHARLES N. BUTLER,
   UTLEY E. CRANE, Jr.